(12) United States Patent
Haller et al.

(10) Patent No.: US 6,295,663 B1
(45) Date of Patent: Oct. 2, 2001

(54) PRESSURIZED SOLAR HEATED SHOWER

(75) Inventors: Clayton Forbes Haller, Pleasant Hill; Charles Prior Hall, Santa Rosa, both of CA (US)

(73) Assignee: Stearns Inc., St. Cloud, MN (US)

( * ) Notice: Subject to any disclaimer, the term of this patent is extended or adjusted under 35 U.S.C. 154(b) by 0 days.

(21) Appl. No.: 09/107,241

(22) Filed: Jun. 30, 1998

(51) Int. Cl.⁷ .................................. A47K 3/28; F24J 2/00
(52) U.S. Cl. .................................. 4/603; 126/626
(58) Field of Search .................................. 126/624, 626; 4/598, 599, 602, 603

(56) References Cited

U.S. PATENT DOCUMENTS

| | | |
|---|---|---|
| 204,879 | 6/1878 | Bozeriah . |
| 2,033,023 | 3/1936 | Brown . |
| 3,483,571 | 12/1969 | Cox, Jr. . |
| 3,513,828 | 5/1970 | Masters . |
| 3,760,431 | 9/1973 | Schwibner . |
| 4,036,209 | 7/1977 | Press . |
| 4,064,570 | 12/1977 | Kim . |
| 4,520,793 | 6/1985 | Hall . |
| 4,539,720 | 9/1985 | Westerweller . |
| 5,774,908 | * 7/1998 | Hall .......................................... 4/602 |

FOREIGN PATENT DOCUMENTS

2035542 * 6/1980 (GB) .................................. 126/624

* cited by examiner

Primary Examiner—Sara Clarke
(74) Attorney, Agent, or Firm—Flehr Hohbach Test Albritton & Herbert LLP

(57) ABSTRACT

Pressurized portable solar heated shower having a flexible shower bag with first and second closed chambers on opposite sides of a flexible membrane enclosed within a flexible outer bag. Water is introduced into the first chamber, and a foot operated pump is connected to the second chamber for pressurizing the second chamber with air to expel the water from the first chamber through a flexible hose and shower head. When not in use, the shower bag is emptied, and the entire device can be folded into a relatively small package which is easily carried by campers, backpackers, boaters, and the like.

9 Claims, 2 Drawing Sheets

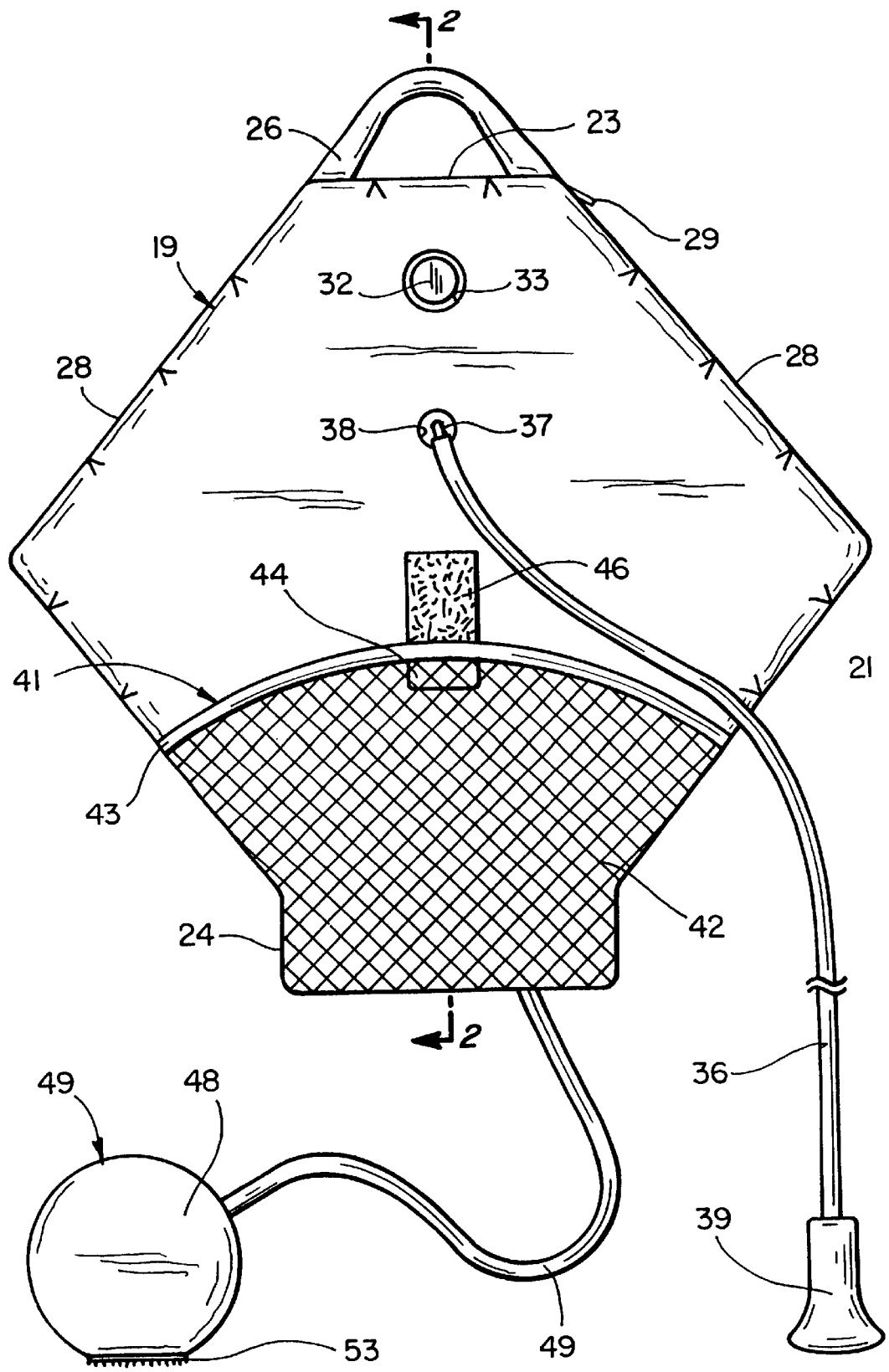
FIG_1

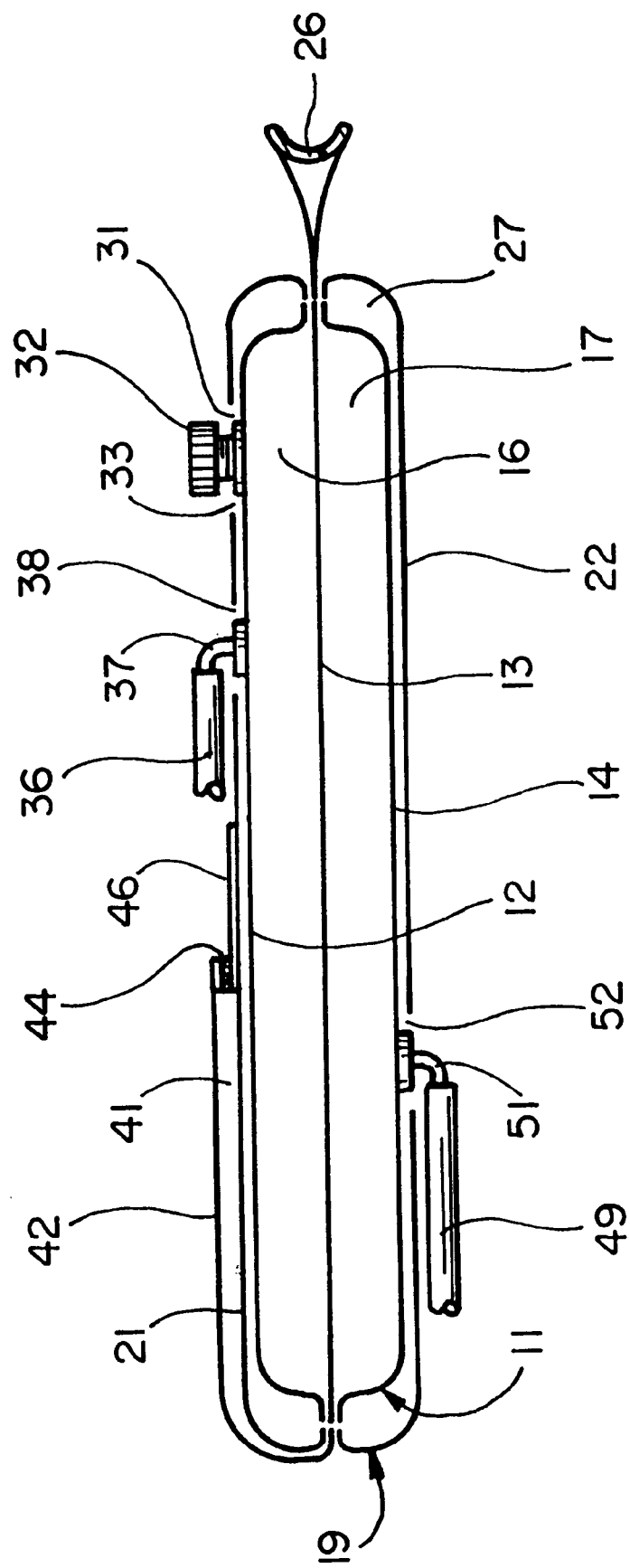
FIG_2

PRESSURIZED SOLAR HEATED SHOWER

This invention pertains generally to equipment for camping and other outdoor use and, more particularly, to a pressurized solar heated shower.

Solar heated showers have heretofore been provided for use by campers, backpackers, boaters and the like. One example of such a shower is found in U.S. Pat. No. 4,520,793. That shower comprises a flexible plastic bag with a spray hose for spraying water onto a bather. The bag holds approximately two gallons of water and is intended to be hung from a tree or other suitable support so the water flows from the bag and through the hose by gravity.

There have also been some attempts to provide pressurized outdoor showers in which water is delivered from a reservoir at ground level to an elevated shower head or nozzle. U.S. Pat. No. 2,033,023, for example, shows a system in which a foot operated pump is placed in a tub of water in which the bather stands, with a rubber spray ring around the bather's neck.

U.S. Pat. No. 3,484,571 shows a camper's shower in which water is heated over a campfire in a rigid metal tank which is then pressurized by a source such as a tire pump to discharge the water from the through a flexible hose and shower head.

U.S. Pat. No. 3,760,431 discloses a kit for converting a standard container into a portable shower. The kit includes a connector which replaces the filler cap of the container for connecting a foot pump and an upright conduit with a shower head to the container.

U.S. Pat. No. 4,539,720 shows a portable personal stall shower in which the bather stands on a rigid footpad atop a flexible water storage bag to pressurize the water and force it through a standpipe and shower head.

It is in general an object of the invention to provide a new and improved pressurized solar heated shower.

Another object of the invention is to provide a pressurized solar heated shower of the above character which is readily portable and particularly suitable for use by campers, backpackers, boaters and the like.

These and other objects are achieved in accordance with the invention by providing a flexible shower bag having first and second closed chambers on opposite sides of a flexible membrane, means for introducing water into the first chamber, an elongated flexible hose communicating with the first chamber and having a shower head at a distal end thereof, and a foot operated pump for introducing air under pressure into the second chamber to pressurize water in the first chamber and expel the water from the first chamber through the hose and the shower head.

FIG. 1 is a top plan view of one embodiment of a pressurized portable shower according to the invention.

FIG. 2 is a cross-sectional view taken along line 2—2 of FIG. 1.

As illustrated in the drawings, the portable shower includes an inner bag 11 which comprises three superposed sheets 12–14 sealed peripherally together to form chambers 16, 17 between adjacent ones of the sheets. The sheets are fabricated of a flexible, water impervious material such as polyvinyl chloride (PVC) of suitable thickness or weight, e.g. 20 mil. PVC. In one present embodiment, chamber 16 has a capacity on the order of 7 gallons, which is enough water for about 7 or 8 showers.

The inner bag, or shower bag, is enclosed within a relatively flat outer bag 19 having upper and lower panels 21, 22 fabricated of a flexible, substantially inelastic material such as nylon. The outer bag serves to reinforce the inner bag and prevent its seams from splitting, as well as protecting it from punctures and other damage as the shower is dragged along the ground. It also serves as a carrying case for the shower.

In this particular embodiment, both inner bag 11 and outer bag 19 are generally diamond-shaped in plan view, with one truncated corner 23 and a generally rectangular protuberance 24 at the corner opposite the truncated corner. A handle 26 is provided at the truncated corner for use in carrying the shower and dragging it along the ground. The handle is fabricated of a flexible material such as nylon webbing, and is affixed by suitable means such as sewing end portions of the webbing into the seam between the two panels of the outer bag toward opposite ends of the truncated corner. The webbing generally follows the lines of the edges of the bag and loops around the corner.

The outer bag has an internal compartment 27 in which the shower bag is received, with an access opening extending along one of the two edges 28 adjacent to the truncated corner. The opening is provided with a closure in the form of a zipper 29.

Means is provided for introducing water into chamber 16. This means includes an inlet fitting 31 which has a threaded cap 32 and is mounted in the upper sheet 12 of inner bag 11. The fitting projects through an opening 33 in the upper panel of the outer bag near the truncated corner so that the chamber can be filled with water without removing the inner bag from the outer bag.

A flexible hose 36 is connected to a fitting 37 which is also mounted on sheet 12 in communication with chamber 16. This fitting extends through an opening 38 in the upper panel of the outer bag toward the center of the panel. A shower head or nozzle 39 is connected to the distal end of the hose, and has a push-pull valve (not shown) of known design for controlling the flow of water through the hose.

A pocket 41 is provided on the upper nylon panel of the outer bag for holding the hose and shower head when they are not in use. In the embodiment illustrated, this pocket comprises a mesh panel 42 which overlies the corner portion of the nylon panel opposite the truncated corner. The outer edge portions of the mesh panel are stitched into the seams along the edges of the bag, and a free edge 43 extends across the bag in a generally diagonal direction to form an opening for the pocket. The free edge is secured in a closed position by a Velcro® fastener which includes a hook section 44 affixed to the mesh panel and a pile section 46 affixed to the nylon panel.

Means is provided for introducing pressurized air into chamber 17. This means comprises a foot operated air pump 47 which is enclosed within another flexible bag or container 48. That container is also fabricated of nylon or other suitable material and is separable from outer bag 19. The pump communicates with the air chamber through a flexible air line or hose 49 connected to an elbow fitting 51 in the bottom wall 14 of the shower bag. That fitting passes through an opening 52 in the lower panel of the outer bag. The pump can be of any suitable type, and in one present embodiment, it is a double acting bellows pump.

A second Velcro® hook section 53 is affixed to one side of the pump bag for engagement with the pile section 46 on the upper panel of the outer bag for attaching the two units together.

Alternatively, if desired, rather than having the pump be a separate unit, it can be place in a pocket in outer bag 19, or the bag which encloses the pump can be permanently attached to the outer bag, e.g. by stitching it into the seam along one edge of the outer bag.

Outer bag 19 is preferably dark in color in order to promote the absorption of solar energy for heating the water in chamber 16. In one presently preferred embodiment, it has a dark red upper panel and a black lower panel.

Operation and use of the shower is as follows. The main unit is placed on the ground or other supporting surface, with panel 21 facing up, and water is introduced into chamber 16 through inlet fitting 31. The unit is then left in the sun to warm the water in the chamber. If necessary, the filled unit can be dragged along the ground by handle 26.

The pump unit is separated from the main unit, and operated to introduce pressurized air into chamber 17. The pressure in the chamber is brought up to a level on the order of 2–3 psi, which is sufficient to lift water about 7 or 8 feet. With 7 gallons in the water chamber, it takes approximately 30 seconds of pumping to reach the desired pressure level. The shower will then operate for approximately 2 minutes without further pumping. If further pressurization is required during the course of a shower, the bather can operate the pump with his foot.

Between showers, the pump unit can be attached to the upper side of the main unit by Velcro® fasteners 53, 46.

For transportation and storage, the air is released from the air chamber, the water chamber is emptied, and hose 36 is coiled up and placed in pocket 41, along with spray head 39. The bag unit can then be folded or rolled into a compact package around the pump unit, or the pump unit can be kept separate, if desired.

The invention has a number of important features and advantages. It provides a pressurized solar shower which is light in weight and easy to carry. It has a relatively high capacity and is easily pressurized and repressurized as needed. Being fabricated almost entirely of flexible materials, it can be rolled or folded into a relatively small package for transportation and storage.

It is apparent from the foregoing that a new and improved pressurized solar shower has been provided. While only certain presently preferred embodiments have been described in detail, as will be apparent to those familiar with the art, certain changes and modifications can be made without departing from the scope of the invention as defined by the following claims.

What is claimed is:

1. A portable shower, comprising: a shower bag having first and second closed chambers on opposite sides of a flexible membrane, an outer bag of substantially inelastic material enclosing the shower bag, means for introducing water into the first chamber, an elongated flexible hose communicating with the first chamber and having a shower head at a distal end thereof, and means for introducing air into the second chamber under sufficient pressure to pressurize water in the first chamber and expel the water from the first chamber through the hose and the shower head, the outer bag serving to reinforce the shower bag and prevent the shower bag from being ruptured by the pressure.

2. The portable shower of claim 1 wherein the pump is enclosed in a flexible container which is separable from the outer bag, and is connected to the first chamber by an air line.

3. The portable shower of claim 1 wherein the outer bag includes a pocket for holding the flexible hose.

4. The portable shower of claim 1 wherein the shower bag and the outer bag are generally diamond-shaped, with one corner of the outer bag being truncated and provided with a handle.

5. The portable shower of claim 1 wherein the outer bag is fabricated of nylon.

6. A portable shower, comprising:

a relatively flat diamond-shaped bag having upper and lower panels of substantially inflexible material and a truncated corner, an internal compartment with an opening along one edge of the bag adjacent to the truncated corner, a closure for the opening, and a handle at the truncated corner;

a shower bag disposed in the compartment comprising three superposed sheets of flexible material sealed peripherally together to form first and second closed chambers on opposite sides of one of the sheets;

a water inlet communicating with the first chamber and extending through a first opening in the upper panel of the outer bag;

an elongated flexible hose communicating with the first chamber and extending through a second opening in the upper panel of the outer bag, with a shower head at a distal end of the flexible hose;

a foot operated pump enclosed in a flexible container separable from the outer bag for introducing air under pressure into the second chamber to pressurize water in the first chamber and expel the water from the first chamber through the hose and the shower head; and a flexible air line connecting the pump with the second chamber through an opening in the lower panel of the outer bag.

7. The portable shower of claim 6 further including a pocket on the outer side of the upper panel of the outer bag for holding the flexible hose.

8. The portable shower of claim 7 wherein the pocket is fabricated of a mesh material.

9. The portable shower of claim 6 including hook and pile fastener means on the pump container and on the upper panel of the outer bag for attaching the pump to the bag.

* * * * *